A. ESCHENLOHR.
Dressing Cattle.
No. 77,724.
2 Sheets—Sheet 1.
Patented May 12, 1868.
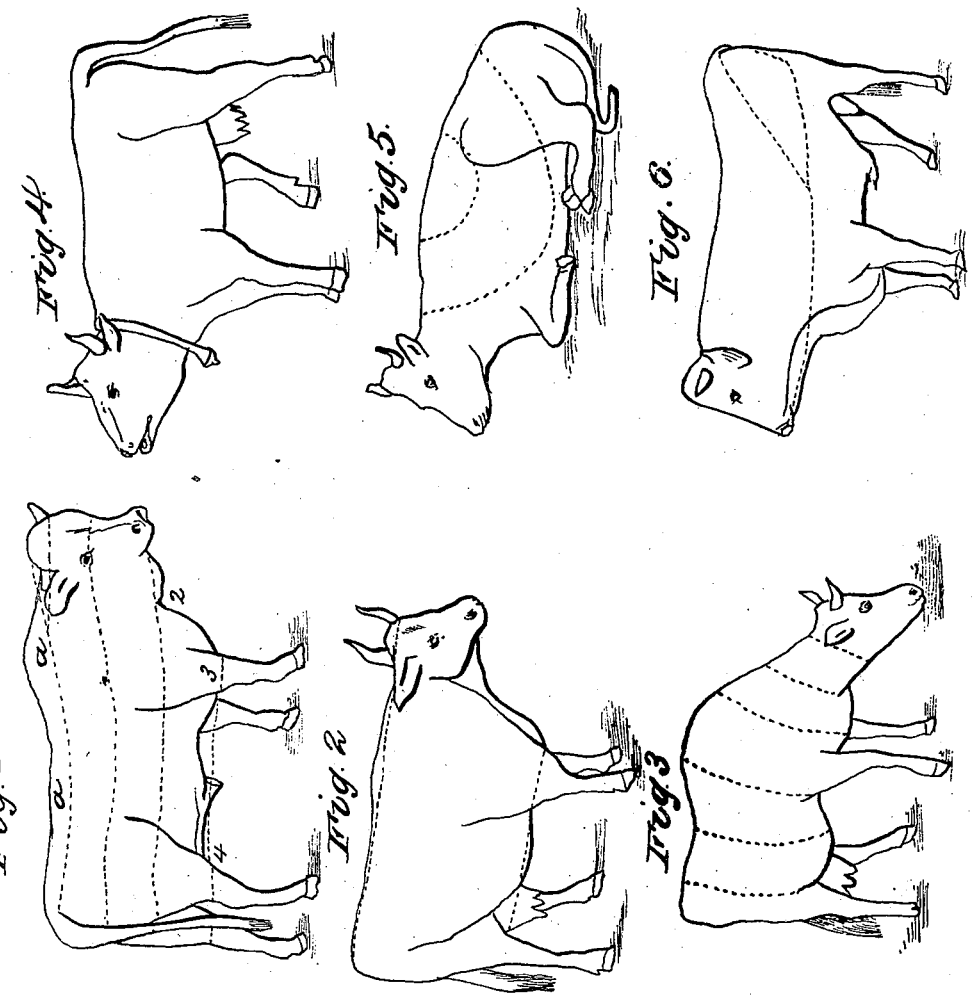
Witnesses
M. Bailey
C. Hager jr.
Inventor
Alois Eschenlohr
by J. Pollok
his atty A. ESCHENLOHR.
Dressing Cattle.
No. 77,724.
2 Sheets—Sheet 2.
Patented May 12, 1868.
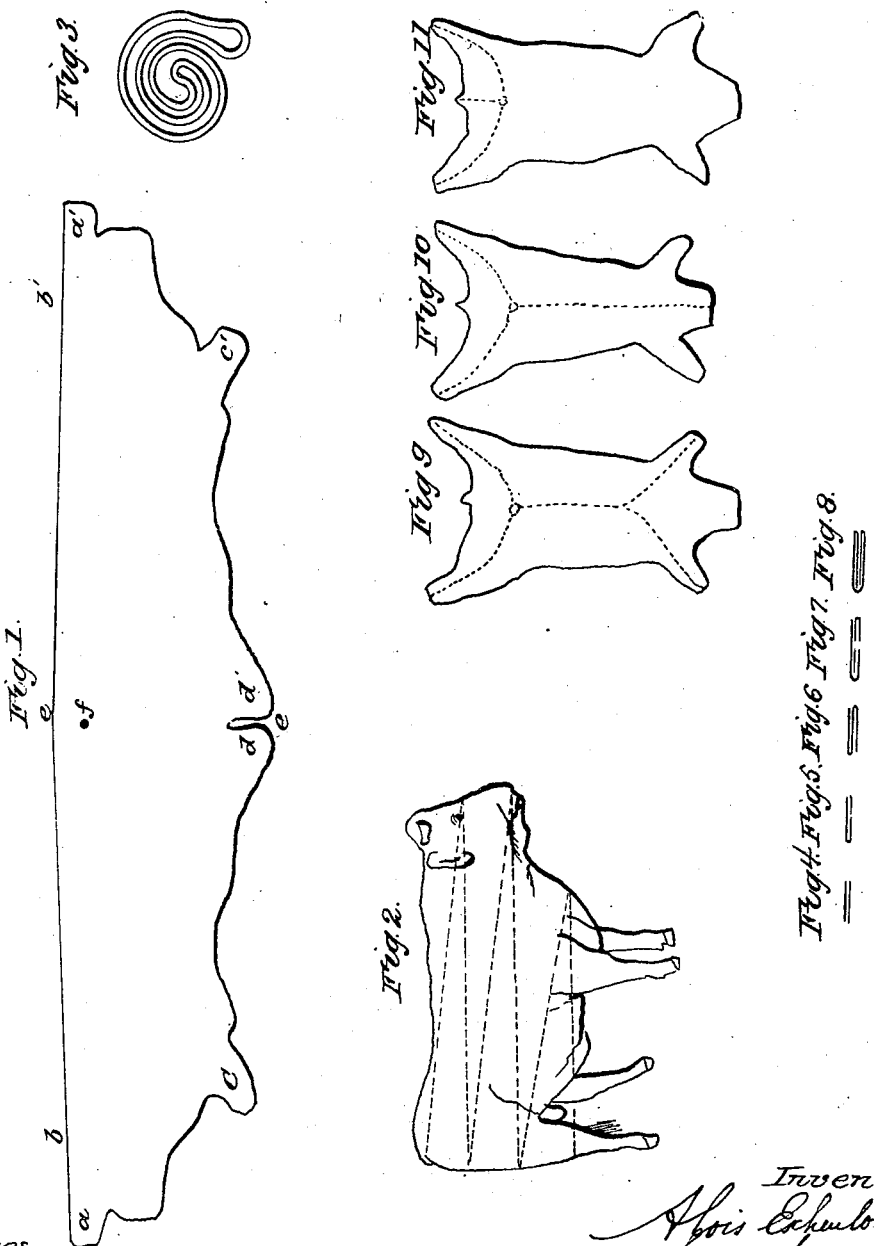

United States Patent Office.

ALOIS ESCHENLOHR, OF MUNICH, BAVARIA.

Letters Patent No. 77,724, dated May 12, 1868.

---

IMPROVEMENT IN SEAMLESS LEATHER STRAPS AND TUBES.

---

The Schedule referred to in these Letters Patent and making part of the same.

---

TO WHOM IT MAY CONCERN:

Be it known that I, ALOIS ESCHENLOHR, of Munich, Bavaria, have invented a certain new and improved Method of Skinning and Cutting out the Skin of Animals into Endless Belts or Straps of great length; and I hereby declare the following to be a full, clear, and exact description of the same, reference being had to the annexed sheet of drawings.

My invention consists in a certain method of skinning the dead animal and cutting out the skin so as to obtain leather straps for transmission of motion, and also tubes of large diameter, wherein no seam nor riveting, nor soldering, is required.

Heretofore it has been practically impossible to obtain leather straps or bands of great length for tubes and other purposes, owing to the usual method of skinning, whereby the thong cut out could not be longer than the animal's body. I have devised several modes of skinning and cutting out the skin, so as to obtain from one skin-surface the longest possible straps.

First method. The animal being knocked down is skinned, and the skin is cut out through the dorsal and then through the axial longitudinal lines, the cut extending along the whole length of the belly. The skin, by this means, is separated into two parts, save the hind parts, which connects the two parts; and said skin, being once spread or developed, will yield straps of twice the length of the animal.

Figure 1, sheet 1, represents the skin spread out.

$a$ and $a'$, head-skin.

$b$ and $b'$, cut through the dorsal line.

$c$ and $c'$, skin from the fore legs.

$d$ and $d'$, skin from the hind legs.

$e$ and $e'$, skin from the hind part of the animal, the only part which is not cut out.

$f$, anus-hole.

Second method. This method will now be explained, reference being had to fig. 1, sheet 2, of the drawings.

Skinning Process.

The animal being knocked down as usual, the under part of the neck is cut open from 1 to 2, and under the belly from 3 to 4.

These incisions suffice for the removing of the flesh and bones. There now remains a skin-cylinder, which can be cut out in various ways.

First. When seamless straps are wanted, I cut longitudinally parallel bands or zones, as in fig. 1, sheet 2. There remain, after this operation, a plane surface, $a$, the chine or vertebral column, and three endless seamless straps. More of these may be obtained by cutting out narrower zones, so as to obtain narrower straps.

Second. When it is desired to obtain, with the same skin, one single strap cut out from the whole skin-surface, it will suffice to cut the skin spirally, as shown at fig. 2, sheet 1. This strap need have but one seam, which would be formed by joining the two ends through the width of the strap.

Third method. The head of the animal is cut off, and the back part cut open, and thereby a skin-cylinder is obtained, which is cut out spirally when a long strap is desired, or into parallel zones when endless straps are wanted. This third method resembles somewhat the second, the zones being cut out transversely instead of longitudinally.

When it is desired to obtain from a skin, removed in the usual manner, one strap only of great length, then on the skin laid flatwise, two spiral lines or cuts are drawn or cut, as shown in Figure 3, sheet 1, wherein a first spiral line is drawn, which, after full development, is drawn inversely back, so as to form a second spiral, which passes between the first cut, and which finally returns to join the starting-point of the first.

The tanning and cambering are effected in the usual way, the latter operation being for the purpose of straightening the band.

To obtain a double strap, I fold one upon the other.

Figures 4, 5, 6, 7, and 8, sheet 1, show transverse sections of these doubled straps. The union of the two parts may be obtained by means of any suitable mastic or glue interposed between them.

Figure 6, sheet 2, shows a method of cutting out the skin in an oblique direction.

Figure 9, sheet 1, represents, in red lines, the path of the skinning-knife through the animal, according to the second method.

Figure 10, sheet 1, shows, likewise in dotted outlines, the path of the skinning-knife through the animal, as represented in elevation, fig. 2, sheet 2.

Figure 11, sheet 1, shows, in red outlines, the path of the skinning-knife through the animal, according to the third method, or as represented in fig. 3, sheet 2.

Having now described my invention, what I claim, and desire to secure by Letters Patent of the United States, is—

1. The method of skinning the animal and cutting out the skin, as herein described, and illustrated in fig. 1, sheet 1, of the accompanying drawings.

2. The method of skinning and cutting out the skin of the animal, so as to form endless belts or straps of great length, in the manner herein described, and illustrated in fig. 2, sheet 1, and figs. 1 and 3, sheet 2, of the accompanying drawings.

ALOIS ESCHENLOHR.

Witnesses:
 HEINRICH HEMMER,
 LEOPOLD HAUSLOHER.